United States Patent [19]

Gara et al.

[11] 4,207,002
[45] Jun. 10, 1980

[54] APPARATUS FOR DETECTING AN OUTPUT IMAGE OF AN OPTICAL CORRELATION

[75] Inventors: Aaron D. Gara; Robert W. Lewis, both of Rochester, Mich.

[73] Assignee: General Motors Corporation, Detroit, Mich.

[21] Appl. No.: 970,650

[22] Filed: Dec. 18, 1978

[51] Int. Cl.² ............................................. G01B 11/14
[52] U.S. Cl. ..................................... 356/375; 356/356
[58] Field of Search ........................ 356/356, 373, 375

[56] References Cited

U.S. PATENT DOCUMENTS

| 3,666,359 | 5/1972 | Lee ................................. 350/162 SF |
| 4,045,140 | 8/1977 | Bumgardner ......................... 356/375 |
| 4,074,131 | 2/1978 | Schwebel ............................ 356/375 |

Primary Examiner—John K. Corbin
Assistant Examiner—R. A. Rosenberger
Attorney, Agent, or Firm—Warren D. Hill

[57] ABSTRACT

A coherent optical correlation system produces an output signal in the form of a beam of light which if focused onto an output plane would produce a spot of light somewhere in that output plane. To detect the position that spot would have in the output plane, the output beam is formed into two parts by a beam splitter and each part is passed through a multiple image diffraction grating arranged mutually at right angles to thereby form a linear array of spots parallel to the x and y axes of a correlation output plane. Each series of output spots illuminates a photodiode in a linear diode array thereby identifying the x and the y coordinates of a correlation image.

1 Claim, 3 Drawing Figures

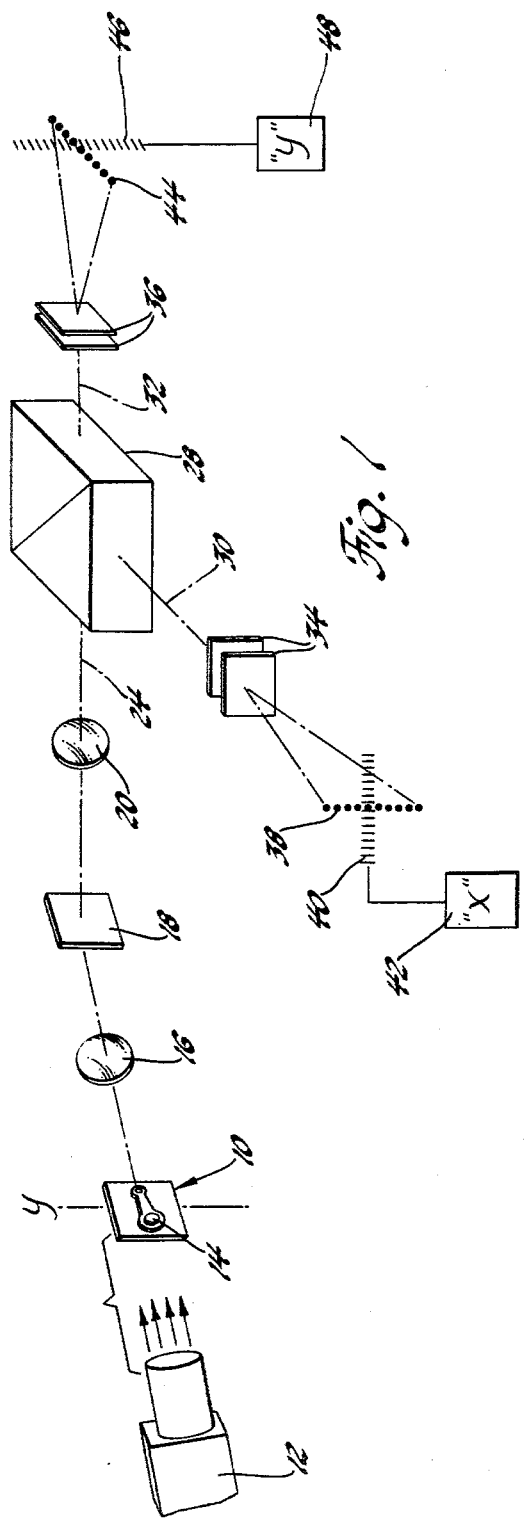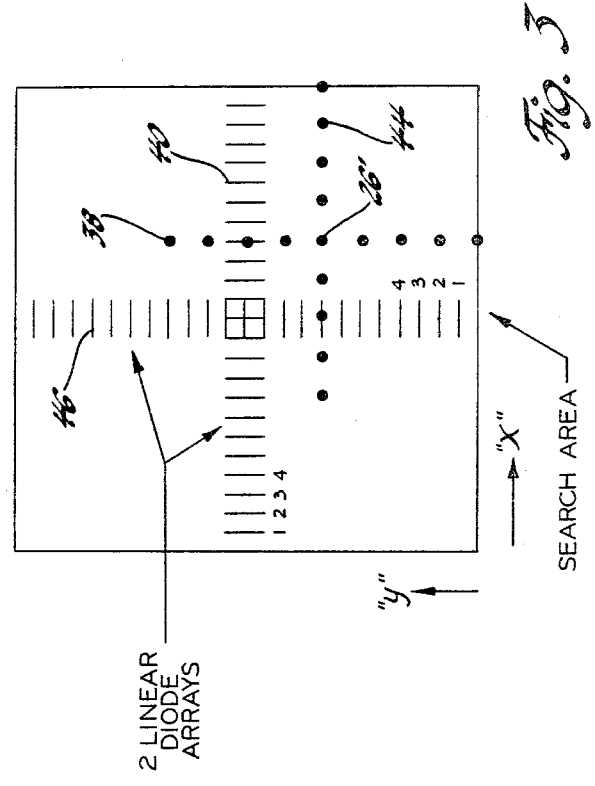

APPARATUS FOR DETECTING AN OUTPUT IMAGE OF AN OPTICAL CORRELATION

This invention relates to apparatus for detecting the position of a correlation image in the output of an optical correlation system.

Optical correlation systems are known in which an input image in an input plane causes a bright correlation spot or image in an output plane if the correlation system is attuned to the input image. That is, the system can recognize a given image pattern and indicates the recognition by producing the correlation spot. Further, the coordinate position of the peak of the correlation spot in the output plane depends upon the position of the input image in its plane, there being a linear correspondence between input image displacement and the output correlation peak displacement. Thus, such a system is useful to detect the position of an input image or an actual object by determining the position of the peak of the correlation spot. It is desirable to make such determinations automatically but usually an area camera such as a television camera is required along with analyzing circuitry to determine the position of the correlation peak. The large amount of data generated by such an area camera can require so much processing time on a computer of practical cost that a system incorporating such data processing can be too slow for use in some applications. Apparatus allowing rapid results is desired for the detection and position measurement of the correlation peak.

It is, therefore, an object of this invention to provide an optical system having no area camera and which allows the detection of a correlation image in a coherent optical correlation system and to define the positional coordinates of the correlation image with a minimum of output data.

The invention is carried out by providing a beam splitter in the correlation output beam to provide two similar beams, multiple imaging diffraction gratings in the beams arranged to provide two orthogonal linear series of correlation spots corresponding to orthogonal coordinates and a linear photodiode array for detecting the coordinate position of each series of correlation spots.

The above and other advantages will be made more apparent from the following specification taken in conjunction with the accompanying drawings wherein like reference numerals refer to like parts and wherein:

FIG. 1 is a diagrammatic view of a coherent optical correlation system provided with an output detecting arrangement according to the invention.

FIG. 2 is a view of a correlation spot appearing in an output plane of a conventional optical correlation system, and FIG. 3 is a composite of the output planes of FIG. 1 illustrating the effective search area of the system according to the invention.

The coherent optical correlation system, as shown in FIG. 1, uses an input image in the form of a photographic transparency 10 illuminated by a coherent light source 12 such as a laser. The transparency 10 is located in an object input plane defined by x and y coordinates. The image 14 on the transparency 10 is at some unknown position in the input plane. The purpose of the correlation system is to first determine that there is indeed an image 14 in the portion of the input plane which is within the field of view of the system and second to provide an output indication of the position of the image within its x-y plane. The correlation system is also able to sense the angular position of the input image but for the sake of simplicity that well known function and its attendant apparatus is omitted from the ensuing description. The optical correlation system is not limited to analyzing an image on a photographic transparency. Indeed, there are other known methods of providing such a coherent input image including methods to evaluate an actual object in real time. The photographic transparency 10, however, is used as an exemplary image input means for purposes of this description since the invention to be described concerns not the input portion of the system but rather the analysis of the optical output of the system.

A spherical imaging lens or transform lens 16 is positioned one focal length away from the input plane so that the image 14 lies in the front focal plane of the lens 16. The back focal plane or transform plane of lens 16 contains a spatial filter 18 which preferably is a holographic spatial filter constructed from the Fourier transform of a master image or pattern corresponding to the image 14. A second spherical lens 20 is positioned to receive a correlation beam from the spatial filter 18 and focus that correlation beam into an output image or correlation image. Traditionally, according to the prior art techniques, the correlation beam 24 is focused onto an output plane $x_1$-$y_1$, as shown in FIG. 2, in the form of a discrete spot 26 having a position in the $x_1$-$y_1$ plane corresponding to the position of the image 14 in the input plane. By placing a screen in the output plane or correlation plane, the spot is readily identified visually. Where, however, it is necessary to use automatic apparatus to measure the position of the peak of the correlation spot 26, an area camera has been required. The number of resolution elements (or data points) for an area camera would be $N^2$ where N is the number of points in each direction of the search area. This invention provides a more rapid way of accurately determining the position of the correlation spot 26 or more specifically the position of a correlation image which is equivalent to the spot 26. In particular, this invention uses two linear detectors covering the same search area as the area camera so that the data handling requirements are reduced from $N^2$ to $2N$.

The correlation beam is separated into two channels which are separately analyzed for correlation image position in the x coordinate and y coordinate of correlation space. The channel separation is accomplished by a beam splitter 28 in the path of the focused correlation beam 24 to produce two similar output beams 30 and 32. Two sets of multiple imaging diffraction gratings 34 and 36 are set in the path of the beams 30 and 32. The gratings comprising the set 34 are comprised of a series of parallel horizontal lines which by diffraction spread the correlation beam 30 in a vertical pattern so as to produce a vertical linear series 38 of spots in an x correlation plane rather than a single correlation spot. A photoelectric detector in the form of a linear photodiode array 40 is arranged transverse to the series 38 of spots, i.e. along an x axis, to detect the x position of the image in correlation space. Circuitry 42 for scanning the diode array and developing a signal indicative of the x coordinate of the image is provided. The correlation beam 32 is analyzed by a set 36 of diffraction gratings having vertically extending parallel lines to produce a series 44 of correlation spots in a y correlation plane spread along a horizontal line. A vertically oriented linear photodiode array 46 extends transverse of the series 44 of correlation spots and electronics 48 samples the photodiodes to determine the y position of the correlation image in y correlation space as determined by the position of the series 44 of correlation spots.

Multiple imaging diffraction gratings are well known optical devices. Surface relief phase gratings each providing three dominant diffraction orders are preferred. When used with a helium-neon laser beam having a wavelength of 0.6328 microns, a grating periodicity of 60 micrometers will produce three dominant output beams having 0.6° angular separation. One such grating in a focus correlation beam then will form an output image of three collinear correlation spots. Two such gratings in series, when properly spaced, will produce a collinear series of nine equally spaced correlation spots.

Linear diode array cameras containing the electronics 42 or 48 for scanning and outputing electrical signals representing diode illumination are commercially available. An example of one such array has 256 diodes in a row on one mil centers. That device is a solid state line scanner Model No. RL 256C/17 manufactured by Reticon Corporation of Sunnyvale, Calif. Each individual diode is a narrow rectangle 17 mils long. In order to insure the detection of a series of spots transverse to the diode array, it is essential that the separation between the spots of a series be less than the length of a diode, that is, less than 17 mils. If a spot separation of 15 mils is assumed, then the length of each series of nine dots is 120 mils. Thus, a correlation spot pattern will be detected if the central correlation spot is within a search area extending a distance of 68 mils from the center line of the linear diode array detector.

FIG. 3 illustrates the net effect of the combined information from the two output planes of the system of FIG. 1. FIG. 3 does not represent a condition which physically occurs in the system of FIG. 1. Rather, it merely represents the x output correlation plane with its detector 40 and correlation spots 38 superimposed on the y correlation output plane with its detector 46 and correlation spots 44. The central correlation spot of the two series forms the center of a cross and is denoted 26' since it corresponds to the prior art correlation spot 26 of FIG. 2. Thus, even though the central correlation spot 26' is beyond the sensitivity range of either of the diode arrays 40 and 46, the position of the spot can be determined due to the linear multiplication of that spot in orthogonal directions. For simplicity, only a few diodes for each array are shown in FIG. 3. However, since the length of each linear pattern of spots is about 120 mils, then 120 diodes on one mil centers would be utilized. A displacement of the image 14 in the input plane results in a proportionate displacement of the correlation spot 26' in the correlation plane. However, for the system shown in FIG. 1, the scale of the displacement is dependent on the relative focal lengths of the lenses 16 and 22. In practice, a successful correlation system for real time optical correlation utilized an object search area comprising a square of 24" sides and a detection system in correlation space covered, in effect, a 0.133" square. It is not necessary that the correlation spots be so minute that they discretely illuminate only a single photodiode in each array. Rather, the spots may sometimes cover more than one diode and well known electronic techniques must be used to determine the peak of a spot image and, therefore, its center.

It will thus be seen that the invention according to this invention provides a way of automatically analyzing the correlation image output of a coherent optical correlation system to determine the position of the correlation image and, therefore, the position of the input image with a minimum of data to be processed.

The embodiments of the invention in which an exclusive property or privilege is claimed are defined as follows:

1. In an optical correlation system wherein the position of an object within a search area x-y is represented by the position of a correlation image in correlation space, the image being formed by a focused beam of light, means for detecting the position of the correlation image comprising;

a beam splitter in the beam of light to form two light beams, multiple imaging diffraction grating means in each of the two light beams arranged to display two image patterns in respective correlation planes, each image pattern comprising a series of closely spaced spots arranged in a straight line, and a photoelectric detector in each correlation plane, each detector comprising a linear photodiode array positioned orthogonally to and intersecting the image pattern in its respective correlation plane so that a photodiode in each array is illuminated according to the position of the correlation image thereby providing a pair of electrical signals representing the coordinate position of the correlation image.

* * * * *